United States Patent [19]

Koch et al.

[11] Patent Number: 4,997,902

[45] Date of Patent: Mar. 5, 1991

[54] POLYARYL ETHERS WHICH ARE STABLE AT HIGH TEMPERATURES AND HAVE IMPROVED PROCESSIBILITY

[75] Inventors: Juergen Koch, Neuhofen; Robert R. Lieder, Limburgerhof; Gerhard Heinz, Weisenheim, all of Fed. Rep. of Germany

[73] Assignee: BASF Aktiengesellschaft, Ludwigshafen, Fed. Rep. of Germany

[21] Appl. No.: 308,638

[22] Filed: Feb. 10, 1989

[30] Foreign Application Priority Data

Feb. 12, 1988 [DE] Fed. Rep. of Germany ....... 3804393

[51] Int. Cl.$^5$ .................. C08G 8/02; C08G 75/00
[52] U.S. Cl. .................. 528/125; 528/126; 528/128; 528/173
[58] Field of Search .............. 528/125, 126, 128, 173

[56] References Cited

U.S. PATENT DOCUMENTS

| 3,516,966 | 6/1970 | Berr | 528/194 |
| 4,229,564 | 10/1980 | Dahl | 528/175 |
| 4,247,682 | 1/1981 | Dahl | 528/175 |
| 4,398,020 | 8/1983 | Rose | 528/125 |

FOREIGN PATENT DOCUMENTS 184458 6/1986 European Pat. Off. .
1563224 3/1980 United Kingdom .

Primary Examiner—John Kight, III
Assistant Examiner—P. Hampton-Hightower
Attorney, Agent, or Firm—Oblon, Spivak, McClelland, Maier & Neustadt

[57] ABSTRACT

Polyaryl ethers which are stable at high temperatures essentially consist of (A) from 60 to 97 mol % of repeating units of the general formula I

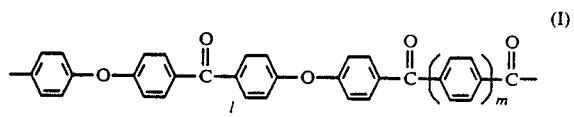

where l and m are each 1 or 2, or their $C_1$–$C_6$-alkyl, $C_1$–$C_6$-alkoxy, aryl, chlorine or fluorine derivatives which are substituted in the nucleus, (B) from 3 to 40 mol % of repeating units of the general formula II

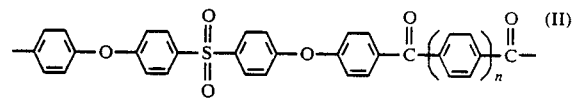

where n is 1 or 2, or their $C_1$–$C_6$-alkyl, $C_1$–$C_6$-alkoxy, aryl, chlorine or fluorine derivatives which are substituted in the nucleus, and furthermore (C) from 0 to 15 mol % of repeating units of the general formulae III and/or IV

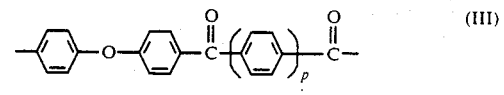

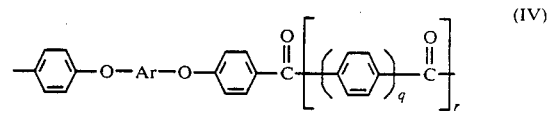

where Ar is

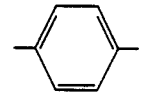

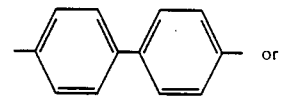

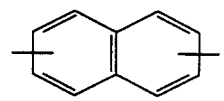

or a $C_1$–$C_6$-alkyl, $C_1$–$C_6$-alkoxy, chlorine or fluorine derivative thereof, r is 0 or 1 and p, q and s are each 1 or 2, or their $C_1$–$C_6$-alkyl, $C_1$–$C_6$-alkoxy, aryl, chlorine or fluorine derivatives which are substituted in the nucleus.

10 Claims, No Drawings

POLYARYL ETHERS WHICH ARE STABLE AT HIGH TEMPERATURES AND HAVE IMPROVED PROCESSIBILITY

The present invention relates to polyaryl ethers which are stable at high temperatures and essentially consist of (A) from 60 to 97 mol % of repeating units of the general formula I

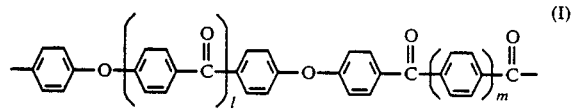

where l and m are each 1 or 2, or their $C_1$–$C_6$-alkyl, $C_1$–$C_6$-alkoxy, aryl, chlorine or fluorine derivatives which are substituted in the nucleus, (B) from 3 to 40 mol % of repeating units of the general formula II

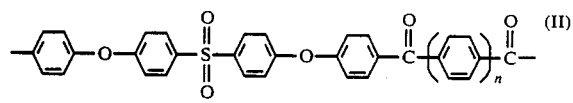

where n is 1 or 2, or their $C_1$–$C_6$-alkyl, $C_1$–$C_6$-alkoxy, aryl, chlorine or fluorine derivatives which are substituted in the nucleus, and furthermore (C) from 0 to 15 mol % of repeating units of the general formulae III and/or IV

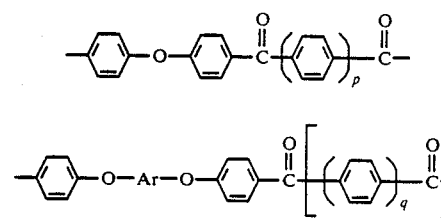

where Ar is

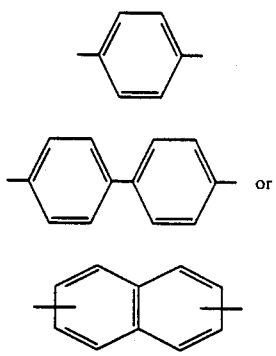

or a $C_1$–$C_6$-alkyl, $C_1$–$C_6$-alkoxy, chlorine or fluorine derivative thereof, r is 0 or 1 and p, q and s are each 1 or 2, or their $C_1$–$C_6$-alkyl, $C_1$–$C_6$-alkoxy, aryl, chlorine or fluorine derivatives which are substituted in the nucleus.

The present invention furthermore relates to the use of such polyaryl ethers for the production of fibers, films, moldings and high-performance composite materials, and to the moldings produced from the polyaryl ethers.

The present invention also relates to blends of the novel polyaryl ethers with polyaryl ether sulfones, their use for the production of moldings, and moldings produced from the blends.

Polyaryl ether ketones and polyaryl ether sulfones are polymers which are stable at high temperatures and have excellent properties, in particular high heat stability, good mechanical strength and toughness and good resistance to chemicals.

Partially crystalline polyaryl ethers, for example polyaryl ether ketones, furthermore possess very good resistance to solvents.

Partially crystalline polyaryl ether ketones have a certain mechanical strength even above the glass transition temperature (Tg), this strength not being lost until the crystal melting point ($T_m$) is reached, which is above 320° C. in the case of known polyether ketones.

When the glass transition temperature is exceeded, the mechanical strength of polyaryl ethers always decreases by a certain percentage; it is therefore desirable to prepare polyaryl ethers having a very high glass transition temperature. However, since the crystal melting point usually, for example in the case of known polyaryl ether ketones, also increases with increasing glass transition temperature, polyaryl ethers having high glass transition temperatures frequently give rise to problems during processing, owing to the fact that their crystal melting point is also very high.

Conventional temperatures for processing from the melt are not less than 30° C. above the melting point; however, many polyaryl ethers begin to decompose and crosslink more or less rapidly at above 400° C., so that polyaryl ethers having melting points close to 400° C. are difficult to process.

For example, U.S. Pat. No. 3,516,966 discloses that a polymer of diphenyl ether and terephthaloyl dichloride is virtually impossible to process from the melt, since this requires extrusion temperatures of 420° C., whereas the polymer already decomposes at above 400° C.

Furthermore, conventional apparatuses for processing polymers via the melt are not usually designed for temperatures above 400° C.

Attempts have therefore already been made to reduce the crystal melting points of polyaryl ethers.

Thus, U.S. Pat. No. 3,516,966 describes a copolymer of diphenyl ether, terephthaloyl dichloride and isophthaloyl dichloride. Very generally, the melting point of partially crystalline polyaryl ethers can be reduced by introducing meta bonds; at the same time, however, the glass transition temperature and the crystallinity are also reduced, so that, for example, copolymers of the abovementioned type containing more than 30 mol % of isophthaloyl dichloride crystallize only with difficulty. Furthermore, meta-phenylene groups are usually less chemically stable than para-phenylene groups, so that such copolymers have lower stability than polymers which have exclusively para-bonded aromatic units.

EP-A No. 184 458 states that, by concomitantly using a certain amount of monomers containing diphenyl units, it is possible to achieve a certain reduction in the melting point without the glass transition temperature decreasing to the same extent.

However, the copolymers described in EP-A No. 184 458 and having a satisfactory melting point possess glass transition temperatures of less than 160° C. Copolymers having a higher glass transition temperature also have excessively high crystal melting points.

Furthermore, the copolymers described in EP-A No. 184 458 contain phenylene units which have two adjacent ether groups. Such phenylene groups have lower chemical stability and, for example, are readily sulfonated since the electron-displacing effect of the ether groups is not cancelled by an electron-attracting effect of a keto or sulfone group.

GB-A-No. 1,563,224 describes in Examples 6 and 7 copolymers from 25–50 mol % units of the formula I and 50–75 mol % of units of the formula II, which, however, owing to their relatively high levels of sulfone groups, are not fully satisfactory.

In general, the methods described to date in the literature for the preparation of polyaryl ethers having a high glass transition temperature in combination with good processibility are therefore not completely satisfactory.

It is an object of the present invention to prepare polyaryl ethers which have a high glass transition temperature in combination with good processibility and furthermore contain only para-bonded phenylene units and in which each phenylene group has one or more adjacent electron-attracting groups.

We have found that this object is achieved by the polyaryl ethers according to claim 1, which are stable at high temperatures. Preferred polyaryl ethers are described in the subclaims.

The novel polyaryl ethers which are stable at high temperatures contain, as component (A), from 60 to 97, preferably from 70 to 95, mol % of repeating units of the general formula (I)

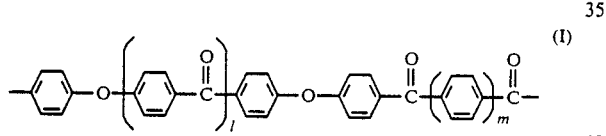

(I)

The aromatic units may contain $C_1$-$C_6$-alkyl, $C_1$-$C_6$-alkoxy, aryl, chlorine or fluorine substituents. Methyl, ethyl, isopropyl, n-propyl, methoxy, ethoxy, phenyl, trifluoromethyl and chlorine are merely examples of substituents.

In general, however, unsubstituted units of the general formula (I) are preferred.

The parameters l and m independently of one another are each 1 or 2. It is also possible to use copolymers in which both groups where l is 1 and those where l is 2 are present in the polymer molecule.

The novel polyaryl ethers which are stable at high temperatures contain, as component (B), from 3 to 40, preferably from 5 to 30, mol % of repeating units of the general formula (II)

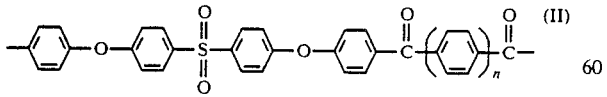

(II)

or their $C_1$-$C_6$-alkyl, $C_1$-$C_6$-alkoxy, aryl, chlorine or fluorine derivatives which are substituted in the nucleus. However, as in the case of the repeating units of the general formula (I), unsubstituted units of the general formula (II) are generally preferred. Regarding examples of appropriate substituents, reference may be made in this case to the statements on the units of the general formula (I).

The parameter n, like the paramater m, may be 1 or 2.

In addition to the essential components (A) and (B), the novel polyaryl ethers may also contain smaller amounts, i.e. from 0 to 15, preferably from 0 to 10, mol %, of repeating units of the general formula (III) or (IV) or mixture of these.

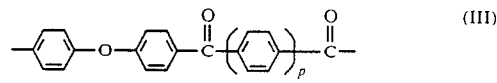

(III)

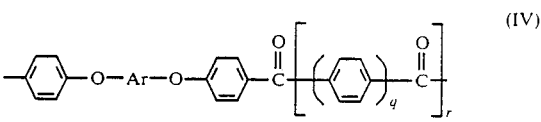

(IV)

As in the case of the general formulae (I) and (II), in the repeating units (III) and (IV) too the aromatic rings can be substituted by $C_1$-$C_6$-alkyl, $C_1$-$C_6$-alkoxy, aryl, chlorine or fluorine groups; however, the unsubstituted units are preferred.

The parameter Ar in the general formula (IV) is a phenylene, diphenylene or naphthylene radical which may also be correspondingly substituted.

The parameters p and q may be 1 or 2 and the parameter r may be 0 or 1.

Some examples of repeating units of the general formula (IV) are shown below:

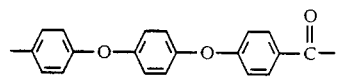

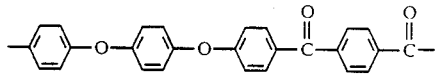

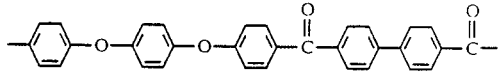

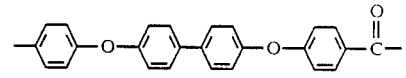

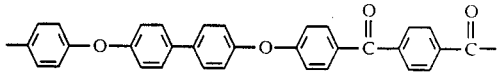

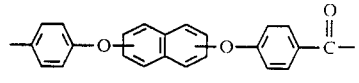

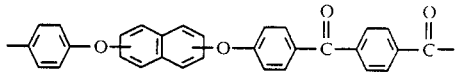

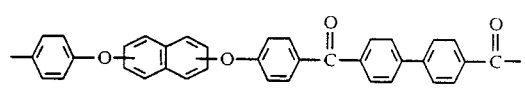

The novel polyaryl ethers have glass transition temperatures of more than 170° C. and crystal melting points of less than 375° C. In addition, they have excellent stability, owing to the fact that exclusively paraphenylene units are present, these units being deactivated by one or more electron-attracting groups.

The relative viscosity of the novel polyaryl ethers is in general from 1.2 to 2.5, preferably from 1.4 to 2.0 (measured at 25° C. in concentrated sulfuric acid at a concentration of 0.5 g of polymer in 100 ml of sulfuric acid).

The novel polyaryl ethers can also be mixed, in a weight ratio of from 80:20 to 20:80, in particular from 30:70 to 70:30, with conventional polyaryl ether sulfones, as are commercially available. Such blends of partially crystalline polyaryl ethers and amorphous polyaryl ether sulfones have an interesting property spectrum.

Processes for the preparation of the novel polyaryl ethers are known per se and are described in the literature.

A first possible method is electrophilic Friedel-Crafts polycondensation, by reacting

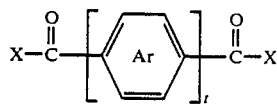

with a mixture of

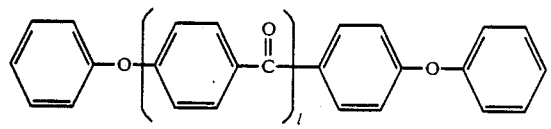

and

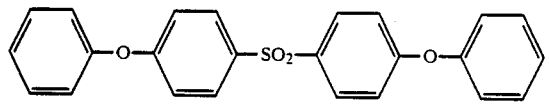

where X is a group which can undergo substitution under the conditions of a Friedel-Crafts reaction, and the parameters l and t may each be 1 or 2.

Preferred examples of X are halogen and alkoxy OR', where R' is lower alkyl, in particular methyl, ethyl, propyl or isopropyl.

For the preparation of repeating units having substituents on the aromatic rings, the corresponding substituted compounds can be used.

A preferred monomer of the first structure mentioned above is terephthaloyl dichloride.

The sum of the molar amounts of the first-mentioned monomer and of the mixture of the two last-mentioned monomers should be essentially equivalent, so that polyaryl ethers having a sufficiently high molecular weight can form. A slight stoichiometric imbalance in the weight ratio can be used for controlling the molecular weight.

Depending on the amounts of the repeating units of the general formulae (I) and (II), the molar ratio of the two last-mentioned monomers is from 60:40 to 97:3, preferably from 70:30 to 95:5. Instead of the monomers where l is 1 or 2, it is also possible to use mixtures of monomers where l is 1 and those where l is 2.

If it is also intended to incorporate units of the formulae (III) to (V) in minor amounts into the novel polyaryl ethers, in addition to the units of the general formulae (I) and (II), this can be done by concomitantly using the corresponding monomers. In this case, the stoichiometric ratios have to be appropriately corrected.

Examples of appropriate comonomers which may be used for the preparation of repeating units of the general formulae (III) and (IV) are:
biphenyl-4,4'-dicarbonyl dichloride,
paraphenoxybenzoyl chloride,
1,4-diphenoxybenzene,
diphenyl ether,
1,4-diphenoxynaphthalene,
2,6-diphenoxynaphthalene,
2,7-diphenoxynaphthalene and
4,4'-diphenoxybiphenyl.

The conventional catalysts may be used for carrying out the Friedel-Crafts reaction. Aluminum trichloride, aluminum tribromide, antimony pentachloride, antimony pentafluoride, boron trichloride, boron trifluoride, zinc dichloride, iron trichloride, tin dichloride and titanium tetrachloride may be mentioned here merely as examples.

A preferred process for the preparation of the novel polyaryl ethers is the electrophilic Friedel-Crafts reaction using hydrogen fluoride as a solvent and boron trifluoride as a catalyst, as described in, for example, U.S. Pat. Nos. 3,953,400 and 4,247,682 and 3,956,240.

A variant of this process is furthermore described in DE-A Nos. 34 16 445 and 34 16 446.

A process as described in WO 84/03891 is particularly preferred, the Friedel-Crafts polycondensation being controlled with the aid of a Lewis base.

Preferred Lewis bases are diphenyl sulfone, dimethyl sulfone, N-methylformamide, N,N-dimethylformamide, N,N-dimethylacetamide, N-methylpyrrolidone, tetramethylene sulfone, N-butyronitrile, dimethyl sulfide, imidazole, acetone, benzophenone, trimethylamine, tetramethylammonium chloride, pyridine N-oxide, lithium chloride, lithium bromide, sodium fluoride, sodium bromide, potassium bromide and mixtures of these. Among these, lithium chloride, sodium chloride, dimethyl sulfone, sulfolane and N,N-dimethylformamide are particularly preferred.

The amount of Lewis base is preferably from 0.1 to 4, in particular from 0.2 to 2, equivalents per equivalent of substitutable group (i.e. in general acyl chloride group).

The amount of catalyst, i.e. of Lewis acid, is in general not less than 1 equivalent per equivalent of carbonyl groups, sulfonyl groups or other basic groups. However, an excess of from 0.05 to 0.5 equivalent of Lewis acid per equivalent of basic groups is preferably used.

Among the abovementioned Lewis acids, aluminum trichloride is preferably used as the catalyst.

Particularly suitable solvents for the polycondensation are aprotic solvents, such as dichloromethane, 1,2-dichloroethane, carbon disulfide, o-dichlorobenzene, 1,2,4-trichlorobenzene, o-difluorobenzene and 1,1,2,2-tetrachloroethane.

These can also be used as a mixture with other nonpolar solvents, for example pentane, hexane, heptane, cyclohexane, petroleum ether, 1,1,2-trichlorotrifluoroethane, chlorotrifluoromethane or the like.

By concomitantly using reagents for blocking terminal groups, as described in, for example, U.S. Pat. No. 4,247,682, the molecular weight of the novel polyaryl ethers, the degree of branching and the gel content can be controlled. As stated above, the molecular weight can also be controlled by varying the monomer ratio.

Reagents for blocking terminal groups are generally added in order to introduce, at one or both ends of the polymer chain, a substituent which has low reactivity. This leads to polymers having a defined molecular weight, reduced gel formation and improved melt stability.

Appropriate reagents are usually monofunctional monomers, which may be both electrophilic and nucleophilic.

Preferred electrophilic reagents for blocking terminal groups are benzoyl chloride, benzenesulfonyl chloride and diphenylcarboxylic acid chloride, whereas preferably used nucleophilic reagents are 4-chlorodiphenyl, 4-phenoxybenzophenone, 4-benzenesulfonyldiphenyl ether and diphenyl itself.

After the end of the polycondensation reaction, the catalyst/polymer complex formed is generally separated into its components by treatment with a base. In this procedure, the base may be added to the reaction medium, or vice versa; in any case, the base should be used in excess in order to achieve complete separation or decomplexing.

Typical bases which may be used for this decomplexing are water, aqueous hydrochloric acid, methanol, ethanol, acetone, N,N-dimethylformamide, tetrahydrofuran, pyridine, dimethyl ether, diethyl ether, dimethyl sulfide, tetramethylene sulfone, benzophenone and isopropanol.

The polymer can then be obtained by known methods, such as filtration, the addition of a nonsolvent to a solution of the polymer or the addition of the polymer solution to a nonsolvent, or by evaporating the volatile components.

To improve the polymer properties, in particular the melt stability, it is advantageous if residues of the catalyst and of the solvent are very substantially removed from the polymer by extraction. For example, water or aqueous hydrochloric acid can be used for this purpose; organic solvents in which the catalyst is soluble, e.g. methanol, ethanol, acetone, acetylacetone, N,N-dimethylformamide and isopropanol, are also suitable for this purpose.

The second possible method for the preparation of the novel polyaryl ethers is the nucleophilic substitution reaction, as described, for example, in U.S. Pat. No. 4,320,224 and by Attwood et al. in Polymer 22 (1981), 1096.

Very generally, the preparation by the nucleophilic method is carried out by reacting a dihalo monomer with a dihydroxy monomer.

In the present case, suitable dihalo monomers for producing the units of the general formulae (I) and (II) are 1,4-di-(4-fluorobenzoyl)-benzene and 4,4'-di-(4-fluorobenzoyl)-diphenyl, and suitable dihydroxy monomers for this purpose are 4,4'-dihydroxybenzophenone and 1,4-di-(4-hydroxybenzoyl)-benzene, as a mixture with 4,4'-dihydroxydiphenyl sulfone in the appropriate molar ratios.

Of course, the correspondingly substituted monomers are used for the preparation of units of the general formulae (I) and (II) in which the aromatic rings are substituted.

The molar ratio of 4,4'-dihydroxybenzophenone or 1,4-di-(4-hydroxybenzoyl)-benzene, or mixtures thereof, to 4,4'-dihydroxydiphenyl sulfone or its substituted derivatives is from 60:40 to 97:3, preferably from 70:30 to 95:5, depending on the distribution of the units of the general formulae (I) and (II).

To incorporate repeating units of the general formulae (III) and (IV), corresponding amounts of further comonomers may be added. Hydroquinone, 4,4'-dihydroxybiphenyl, 1,4-dihydroxynaphthalene, 2,6-dihydroxynaphthalene, 2,7-dihydroxynaphthalene, 4,4'-dihydroxydiphenyl ether, 4,4'-difluorobenzophenone, 4,4'-dichlordiphenyl sulfone, 4,4'-di-(4-fluorobenzoyl)-biphenyl and 4,4'-di-(4-chlorobenzenesulfonyl)-biphenyl may be mentioned here merely as examples.

The reaction of the monomers is carried out in a high boiling inert solvent, using a base. A preferred solvent/base combination is diphenyl sulfone/potassium carbonate, although in principle it is also possible to use the other bases or base mixtures and solvents or solvent mixtures which are known from the literature.

As stated above, the novel polaryl ether ketones have high glass transition temperatures in combination with relatively low crystal melting points. They also have excellent chemical stability.

Because of this property spectrum, the novel polyaryl ethers which are stable at high temperatures are particularly suitable for the production of fibers, films and moldings, in particular in the area of electrical engineering and electronics and in general for components subjected to high temperatures.

EXAMPLE 1

(Comparison)

Preparation of polyether ketone ether ketone ketone 30 ml of dichloromethane (freshly distilled over phosphorus pentoxide) were initially taken in a 250 ml three-necked flask provided with a stirrer, a nitrogen inlet and an internal thermometer.

The flask was flushed with nitrogen and was kept under nitrogen during the entire synthesis. The content of the flask was cooled to $-27°$ C. with acetone/dry ice, and 24.47 g (183.5 mmol) of anhydrous aluminum chloride were added via a powder funnel. 5.54 g (78.5 mmol) of N,N-dimethylformamide (DMF, freshly distilled over calcium hydride) in 15 ml of methylene chloride were added slowly to the resulting suspension, the slow addition being necessary owing to the vigorous evolution of heat. A solution of 9.4094 g (25.68 mmol) of 4,4'-diphenoxybenzophenone, 5.1365 g (25.3 mmol) of terephthaloyl chloride and 0.1067 g (0.76 mmol) of benzoyl chloride in 50 ml of methylene chloride was added with further cooling.

The vessels used for weighing were washed with an additional 10 ml of methylene chloride in order to ensure complete transfer of the monomers.

The stirred reaction mass was heated to room temperature in the course of about 6 hours. During this time, a viscous reddish orange suspension formed, which solidified to give a porous foam. The gel-like mass was removed mechanically from the flask, comminuted beforehand by cutting with a knife, and comminuted and decomplexed in a household mixer together with ice water. The resulting suspension of white polymer particles in water was stirred in the mixer for about 30 minutes and then filtered. The polymer thus obtained was extracted (6 hours) with three times 500 ml of boiling water. After drying under reduced pressure (100° C., 18 hours), a polymer having a relative viscosity of 1.74 (measured in concentrated sulfuric acid at 25° C., 0.5 g/100 ml) was obtained.

EXAMPLES 2 TO 7

The polycondensation reactions were carried out under the reaction conditions described in Example 1, except that a mixture of diphenoxybenzophenone and diphenoxydiphenyl sulfone was used instead of diphenoxybenzophenone. The amounts of monomers used and the data determined for the polymers obtained are summarized in the Table.

EXAMPLE 8

(Comparison)

Preparation of polyether ketone ketone

In the apparatus described in Example 1, 30 ml of dichloromethane were initially taken and were cooled to below $-10°$ C. with acetone/dry ice. For this purpose, 28.661 g (215 mmol) of aluminum chloride were added and suspended. 7.144 g (75.9 mmol) of dimethyl sulfone were slowly added to this suspension in the course of 5 minutes. 5.137 g (25.3 mmol) of terephthaloyl dichloride and 0.142 g (1.01 mmol) of benzoyl chloride were added with further cooling to about $-15°$ C. 12.142 g (25.81 mmol) of 1,4-bis-(4-phenoxybenzoyl)-benzene were added in one portion, likewise at $-15°$ C. The vessels and powder funnels used for weighing and metering were washed with 10 ml of dry dichloromethane. The acetone/dry ice bath was removed. The stirred reaction mass warmed up slowly to room temperature and became increasingly viscous. After about 20 minutes, it was no longer stirrable. After 6 hours at room temperature, it had solidified to a porous, rubberlike foam. The reaction mixture was removed mechanically from the flask, comminuted by cutting with a knife, and decomplexed in a mixer with an excess of water. The flock-like polymer particles formed were filtered off and substantially freed from catalyst residues by extracting three times with boiling water (2 liters, 30 minutes) and were then dried under reduced pressure at 150° C. The polymer had a relative viscosity of 1.625 (measured in 96% strength sulfuric acid at 25° C., 0.5 g/100 ml).

EXAMPLES 9 TO 12

Mixtures of 1,4-bis-(4-phenoxybenzoyl)-benzene and diphenoxydiphenyl sulfone with terephthaloyl dichloride were reacted under the conditions described in Example 8. The ratios of the monomers to one another and the properties of the polymers obtained are summarized in the Table.

EXAMPLE 13

The following were reacted with one another under the conditions described in Example 8: 3.764 g (10.272 mmol) of 4,4'-dihydroxybenzophenone, 4.857 g (10.272 mmol) of 1,4'-bis-(4-phenoxybenzoyl)benzene, 2.077 g (5.06 mmol) of 4,4'-diphenoxydiphenyl sulfone, 5.137 g (25.3 mmol) of terephthaloyl dichloride and 0.142 g (1.01 mmol) of benzoyl chloride.

The properties of the polymers thus obtained are shown in the Table.

EXAMPLE 14

(Nucleophilic process)

600 g of diphenyl sulfone were initially taken in a 2 l three-necked flask provided with a nitrogen inlet, a stirrer and an internal thermometer and were heated to 180° C. At this temperature, 57.887 g (0.180 mol) of 1,4-di-(p-fluorobenzoyl)-benzene, 30.779 g (0.144 mol) of 4,4'-dihydroxybenzophenone, 8.99 g (0.0360 mol) of 4,4'dihydroxydiphenyl sulfone, 0.072 g (0.36 mmol) of 4-fluorobenzophenone and 27.305 g (0.198 mol) of potassium carbonate were added. Stirring was then carried out for 1 hour at 180° C., for 1 hour at 240° C., for 1 hour at 280° C., for 1 hour at 305° C. and for 2 hours at 315° C. During this procedure, the carbon dioxide and water formed during the reaction escaped. After the end of the reaction, the still hot reaction mass was poured onto a metal sheet, allowed to cool and then comminuted with a hammer. Extraction was then carried out 4 times with 1 l of acetone (50° C.) for 1 hour in each case and 4 times with 1 l of boiling water for 1 hour in each case. The polymer thus obtained was then dried for 18 hours under reduced pressure at 100° C.

The data of the resulting product are likewise shown in the Table.

TABLE

| Example | Molar ratio DPBP:DPDPS | Weight [g] of DPBP | Weight [g] of DPDPS | R.V.[1] | Tg | Tm |
|---|---|---|---|---|---|---|
| 1 | 1.0:0.0 | 9.41 | 0.000 | 1.74 | 171 | 381 |
| 2 | 0.9:0.1 | 8.47 | 1.03 | 1.61 | 175 | 371 |
| 3 | 0.8:0.2 | 7.53 | 2.07 | 1.62 | 177 | 360 |
| 4 | 0.6:0.4 | 5.64 | 4.13 | 1.65 | 178 | 337[2] |
| 5V | 0.4:0.6 | 3.76 | 6.20 | 1.82 | 182 | |
| 6V | 0.2:0.8 | 1.88 | 8.27 | 1.88 | 190 | |
| 7V | 0.0:1.0 | 0.0 | 10.33 | 1.85 | 195 | |
| 8V(3) | 1.0:0.0 | 12.14 | 0.00 | 1.625 | 178 | 390 |
| 9V(3) | 0.9:0.1 | 10.93 | 1.04 | 1.75 | 180 | 379 |
| 10(3) | 0.8:0.2 | 9.71 | 2.08 | 1.73 | 180 | 368 |
| 11(3) | 0.7:0.3 | 8.50 | 3.12 | 1.705 | 181 | 361 |
| 12(3) | 0.6:0.4 | 7.29 | 4.15 | 1.66 | 181 | 361[2] |
| 13(3) | See text | | | 1.78 | 179 | 365 |

| Example | Molar ratio DHPB:DHDPS | Weight [g] of DHBP | Weight [g] of DHDPS | | | |
|---|---|---|---|---|---|---|
| 14 | 0.8:0.2 | 30.779 | 8.990 | 1.55 | 176 | 361 |

[1]Measured at 25° C. in concentrated sulfuric acid, 0.5 g/100 ml.
[2]Does not crystallize completely from the melt on cooling at 20° C./minute, but only when heated.
[3]1,4-bis-(4-phenoxybenzoyl)benzene was used instead of 4,4-diphenoxybenzophenone.
V = Comparative Experiment
Abbreviations used:
DPBP = 4,4'-diphenoxybenzophenone.
DPDPS = 4,4'-diphenoxydiphenyl sulfone.
DHBP = 4,4'-dihydroxybenzophenone.
DHDPS = 4,4'-dihydroxydiphenyl sulfone.
Tg = Glass transition temperature.
Tm = Crystal melting point.
R.V. = Relative viscosity

We claim:
1. A polyaryl ether which is stable at high temperatures and essentially consists of
(A) from 60 to 97 mol % of repeating units of the formula

$$-\phantom{}\!\!\bigcirc\!\!-O\!\!-\!\!\left[\!\!-\!\!\bigcirc\!\!-\overset{O}{\underset{\|}{C}}\!\!-\!\!\right]_{l}\!\!-\!\!\bigcirc\!\!-O\!\!-\!\!\bigcirc\!\!-\overset{O}{\underset{\|}{C}}\!\!-\!\!\left[\!\!\bigcirc\!\!\right]\!\!-\overset{O}{\underset{\|}{C}}\!\!- \quad (I)$$

where l and m are each 1 or 2, or their $C_1$–$C_6$-alkyl, $C_1$–$C_6$-alkoxy, aryl, chlorine or fluorine derivatives which are substituted in the nucleus,
(B) from 3 to 40 mol % of repeating units of the formula II

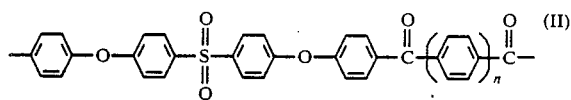 (II)

where n is 1 or 2, or their $C_1$-$C_6$-alkyl, $C_1$-$C_6$-alkoxy, aryl, chlorine or fluorine derivatives which are substituted in the nucleus, and furthermore
(C) from 0 to 15 mol % of repeating units of the formulae III and/or IV

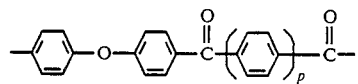 (III)

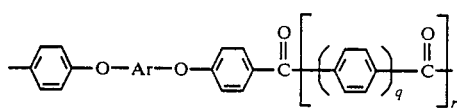 (IV)

where Ar is

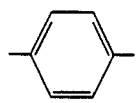

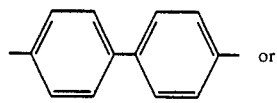 or

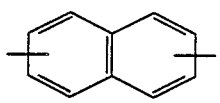

or a $C_1$-$C_6$-alkyl, $C_1$-$C_6$-alkoxy, chlorine or fluorine derivative thereof, r is 0 or 1 and p, q and s are each 1 or 2, or their $C_1$-$C_6$-alkyl, $C_1$-$C_6$-alkoxy, aryl, chlorine or fluorine derivatives which are substituted in the nucleus.

2. A polyaryl ether which is stable at high temperatures, as claimed in claim 1, containing the following:
from 70 to 95 mol % of A),
from 5 to 30 mol % of B) and
from 0 to 10 mol % of C).

3. A polyaryl ether which is stable at high temperatures, as claimed in claim 1, consisting of
(A) from 60 to 97 mol % of repeating units of the formula I and
(B) from 3 to 40 mol % of repeating units of the formula II.

4. A polyaryl ether which is stable at high temperatures, as claimed in claim 3, consisting of
(A) from 70 to 95 mol % of repeating units of the formula II and
(B) from 5 to 30 mol % of repeating units of the formula II.

5. A polyaryl ether which is stable at high temperatures, as claimed in claim 4, wherein a polymer molecule contains both groups where 1 is 1 and those where l is 2.

6. A polymer blend containing from 20 to 80% by weight of a polyaryl ether which is stable at high temperatures, as claimed in claim 1, and from 20 to 80% by weight of a polyaryl ether sulfone.

7. A molding produced from a polyaryl ether which is stable at high temperatures, as claimed in claim 1.

8. A polyaryl ether as claimed in claim 1 which has a relative viscosity ranging from 1.2 to 2.5 as measured at 25° C. in concentrated sulfuric acid at a concentration of 0.5 g of polymer in 100 ml of sulfuric acid.

9. A polyaryl ether as claimed in claim 8, wherein said relative viscosity ranges from 1.4 to 2.0.

10. A polymer blend as claimed in claim 6, wherein the weight ratio of polyaryl ether to polyaryl ether sulfone ranges from 30:70 to 70:30.

* * * * *